UNITED STATES PATENT OFFICE.

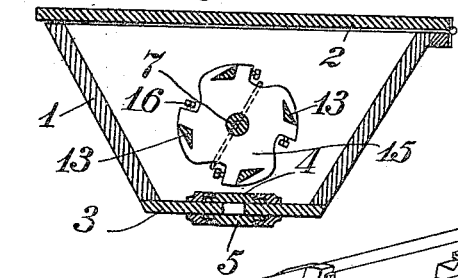
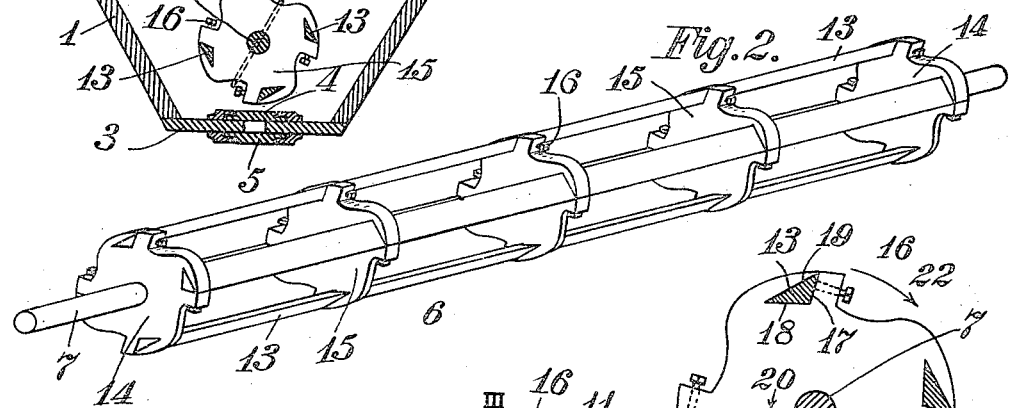
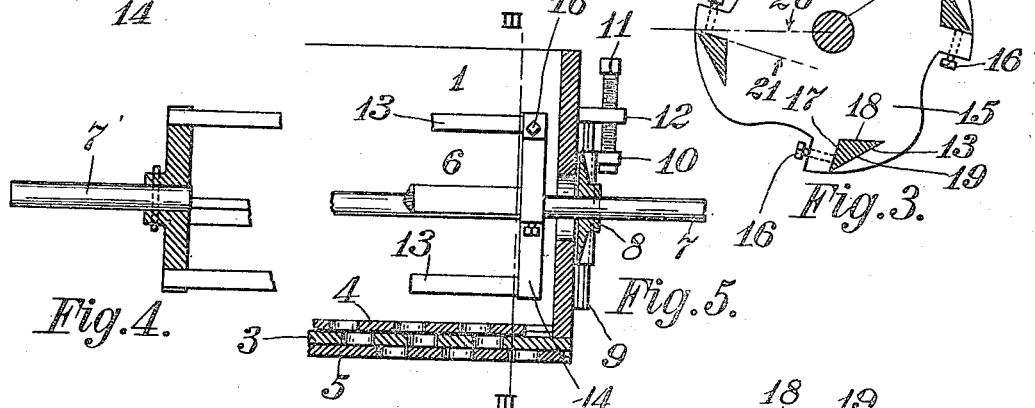
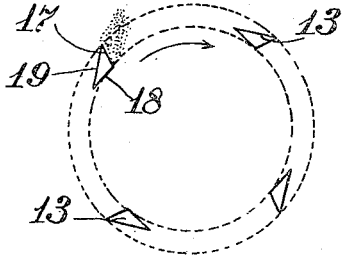
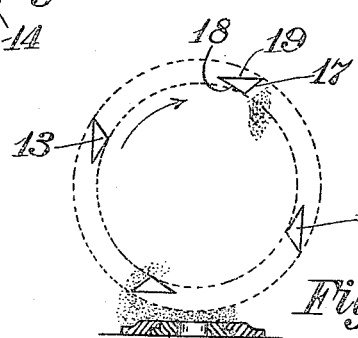

RAY WICKLIFFE, OF MILLERSPORT, OHIO.

FERTILIZER-DISTRIBUTER.

1,256,854.  Specification of Letters Patent.  Patented Feb. 19, 1918.

Application filed June 9, 1916. Serial No. 102,803.

*To all whom it may concern:*

Be it known that I, RAY WICKLIFFE, citizen of the United States, residing at Millersport, in the county of Fairfield and State of Ohio, have invented a certain new and useful Improvement in Fertilizer-Distributers, of which the following is a specification.

The present invention relates to lime and fertilizer distributers, and is designed especially to overcome certain difficulties encountered in the construction and operation of the revolving agitator which forms a component part of the particular class of devices to which the improvements are directed.

In the distributers for fertilizers which comprise a revolving agitator in a hopper, from which the agitator stirs and rotates the fertilizer which falls through openings in the bottom of the hopper when the fertilizer, which may be ground limestone for instance, becomes moist or wet, the lime sticks or adheres to the bars of the agitator with the result that the lime is packed in and around the agitator, instead of stirred by the agitator bars, and the openings in the bottom of the hopper are clogged. When this condition is encountered, the machine runs harder, danger arises of breakage of the device, and the necessity also arises of stopping the machine and clearing the moist lime that has clogged the agitator, so that the lime may pass through the agitator and the hopper bottom to be distributed. To overcome these difficulties and objectionable features I have provided the agitator bars with certain defined and predetermined shapes and angles to the radius of the agitator, in order that the moist lime will not be permitted to adhere to the bars, nor to be much compressed beneath them, and thus eliminate the possibility of packing the lime in the agitator or on the lower portion of the hopper.

In the accompanying drawings I have illustrated one complete example of the physical embodiment of my invention, and a slight modification thereof, constructed according to the best modes I have so far devised the practical application of the principles of the invention.

Figure 1 is a vertical transverse sectional view of a hopper showing the agitator of the present invention adapted thereto.

Fig. 2 is a perspective view of the agitator detached.

Fig. 3 is a transverse sectional view on line III—III Fig. 5, of the agitator on an enlarged scale.

Fig. 4 is a transverse sectional detail view of a modified form of agitator, wherein the agitator is shown provided with an end stub shaft, instead of one long shaft extending the length of the agitator.

Fig. 5 is a central vertical, longitudinal, sectional view of one end of the hopper showing the device for adjusting the height of the agitator relative to the bottom of the hopper.

Figs. 6 and 7 are diagrammatic views showing the relation of the agitator bars to the lime as the agitator is revolved in the hopper.

It will be understood that the hopper 1 is mounted upon a suitable vehicle and is drawn over the ground to distribute the lime or fertilizer, but inasmuch as these devices are well known in the art, it has not been thought necessary to illustrate a vehicle herein. The hopper may be provided with a top or screen cover 2, and its perforated bottom 3 is equipped with an upper slide 4 to regulate the size of the opening or orifice for the passage of the lime or other powdered fertilizer through the slide 4 and perforated bottom 3. An additional perforated slide 5 is located under the bottom, and by means of this slide the entire perforated bottom may be covered, as shown in the drawings, in order to shut off the passage of the lime when it is desired to do so.

The agitator 6 is suspended by its shaft 7 in the ends of the hopper, and to adjust it relatively to the hopper bottom for materials of different degrees of fineness I employ a plate 8, at each end of the hopper, in which the shaft is suspended and has a bearing. The shaft is passed through a vertical slot of sufficient dimension in each end of the hopper, and the plate 8 which is adapted to slide between plates as 9, is formed with an integral ring 10 in which the end of a bolt 11 is loosely fitted so that the bolt may turn freely. The bolt is threaded into a bracket 12, and it will be seen that the bolt may be turned to lift the agitator, or reversely turned to force the agitator downward, through the suspension plates 8.

There are four bars or blades 13 illustrated as part of the agitator 6, and these blades are supported in the two heads 14 and the intermediate disks 15 all of which are recessed for the reception of the blades as shown. The blades may be held in place against lateral movement by means of the set screws 16, or other devices may be used if desired.

The blades 13 are triangular in cross section being formed with the faces 17, 18, 19 and in Fig. 3, especially it will be noted that the plane of the face 17 forms an acute angle with radial dotted line 20, and looking from the perimeter, the line 21 is at the rear of the radial line as the agitator revolves in the direction of the arrow 22. This arrangement of the plane of the face of the blade which comes in direct contact with the lime prevents adherence of the lime to the blade, the proposition being illustrated diagrammatically in Figs. 6 and 7, where the backward inclination of the face 17 in Fig. 6 is not great enough to prevent the blade carrying a quantity of the ground limestone to the upper part of the hopper to stir it up, but the inclination to the radius is best in the neighborhood of fifteen or twenty degrees or as shown in Figs. 7 and 3 to insure that the powdered material shall disengage itself from the blade and fall by gravity through the agitator toward the bottom of the hopper. The described arrangement of the planes of the faces 18 and 19 of the blades also tends to prevent adherence of the powdered fertilizer to the blades as will be clearly evident from the drawings. The continuous rotary movement of the agitator stirs up the powdered fertilizer keeping the material in a loose and flaky condition and preventing clogging of the exits in the hopper bottom, and at the same time sows the fertilizer as the machine passes over the ground.

In Fig. 4 the agitator is provided at each end with a stub shaft 7', and this form of agitator and shaft are employed when the short length of the agitator does not require a single shaft like that indicated by the numeral 7. The elimination of this single shaft leaves the interior of the agitator open for greater movement of the fertilizing material as it is stirred up by the agitator blades, which I prefer to be made of non-rusting material.

There are numerous other advantageous features accruing from the utilization of this peculiar form and position of blade, but as these will be well understood in the art by those familiar with it their enumeration is deemed unnecessary.

What I claim is:

In a fertilizer distributer, the combination with a hopper having discharge openings, of an agitator journaled to rotate in the hopper over said openings, said agitator having a bar located and rigidly secured in the rim of the agitator and extending longitudinally with respect to the axis thereof, said bar having a working face inclined inwardly from the rim of the agitator and rearwardly with respect to the direction of motion of the blade from the radius of the agitator which touches the outer edge of the blade, said bar also having its outer face lying at an acute angle to and meeting the said working face and being inclined inwardly from the path of motion of the line of junction of said faces, substantially as described.

RAY WICKLIFFE.

Copies of this patent may be obtained for five cents each, by addressing the "Commissioner of Patents, Washington, D. C."